No. 804,129. PATENTED NOV. 7, 1905.
J. N. HUMPHREYS.
APPARATUS FOR BLEACHING LARD COMPOUNDS.
APPLICATION FILED MAY 1, 1905.
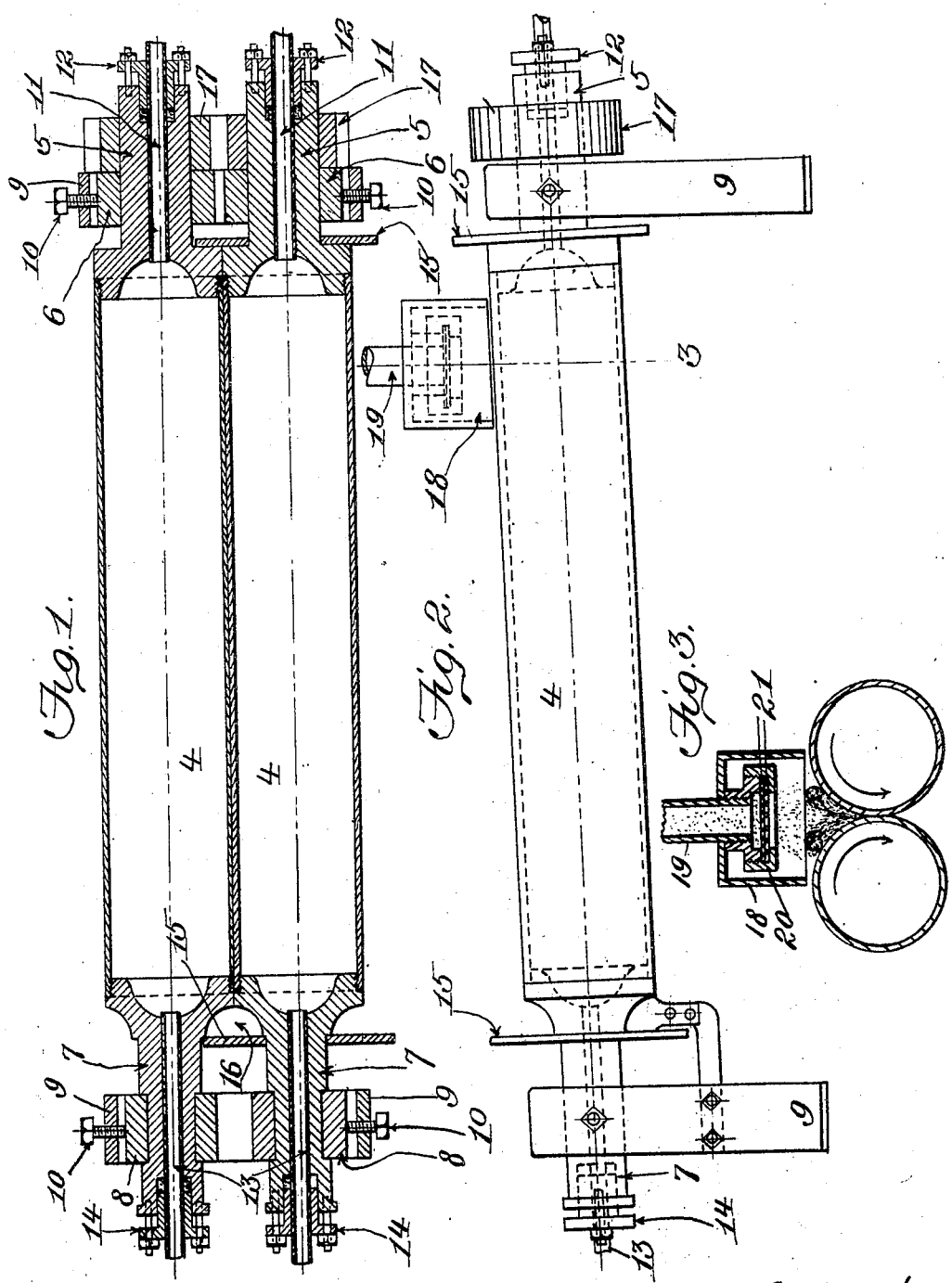
Witnesses.
Inventor.
Jerome N. Humphreys
per James L. Norris.
Attorney.

UNITED STATES PATENT OFFICE.

JEROME N. HUMPHREYS, OF DALLAS, TEXAS, ASSIGNOR TO ARMSTRONG PACKING COMPANY, OF DALLAS, TEXAS, A CORPORATION OF TEXAS.

APPARATUS FOR BLEACHING LARD COMPOUNDS.

No. 804,129.     Specification of Letters Patent.     Patented Nov. 7, 1905.

Application filed May 1, 1905. Serial No. 258,331.

*To all whom it may concern:*

Be it known that I, JEROME N. HUMPHREYS, a citizen of the United States, residing at Dallas, in the county of Dallas and State of Texas, have invented new and useful Improvements in Apparatus for Bleaching Lard Compounds, of which the following is a specification.

This invention relates to the art of bleaching lard compound and other like substances, and has for its object to provide a novel apparatus for subjecting the lard compound to the simultaneous action of grinding or deformation and cooling.

I have illustrated said apparatus in the accompanying drawings, in which—

Figure 1 is a sectional plan view of two bleaching-rollers and their accompanying parts. Fig. 2 is a side elevation of the same, and Fig. 3 is a transverse sectional view on the line 3 of Fig. 2.

Referring now to the drawings, 4 4 indicate, respectively, two rollers, which are in the form of hollow iron or steel cylinders turned true, so that when they roll together they will fit tightly, leaving no space between them. The numerals 5 indicate cast-iron heads screwed into one end of each of said cylinders, respectively, which heads are mounted in suitable bearings 6. The numerals 7 indicate cast-iron heads secured, respectively, in the opposite ends of said cylinder, said heads being supported in suitable bearings 8. The bearings 6 and 8 are held in supports 9 at opposite ends of the rollers 4, as shown, and clamping-screws 10 are provided on the outer side of each of said bearings, said clamping-screws passing through the supports 9 and engaging the respective bearings 6 and 8, whereby the rollers can be forced and constantly held in close contact.

11 indicates brine-inlet pipes passing centrally through the heads 5 and through suitable glands 12, secured in the outer ends of said heads. Brine-outlet pipes 13 pass through the heads 7 and through glands 14, secured in the ends of said heads.

One of the rollers 4 has each of its heads 5 and 7 provided with a collar 15, which are of a sufficient diameter to extend across the space between the heads, the purpose of these collars being to confine the lard compound on the rollers. As shown by Fig. 2, the rollers are set to incline downwardly from their upper to their lower ends, and the heads 7 at said lower ends are suitably grooved on their outer periphery to provide a space 16 between them and the collar 15, through which the lard compound can run off of the rollers.

17 indicates two similar gear-wheels, mounted on the heads 5 of the rollers and in mesh with each other, these gears being employed to cause the rollers to rotate together. This rotation may be caused in any desired manner, as by a driven gear engaging one of the gear-wheels 17, such driving-gear not being shown.

The lard compound is supplied to the rollers near the upper ends thereof, and for this purpose I provide a splash-box 18, extending into which is a pipe 19, supporting a box-union 20, supplied with a strainer 21. The lard compound is forced through the pipe 19 under pressure of about forty pounds and passing through the strainer or gage 21 falls into the space between the rollers at the upper ends thereof. These rollers are revolved in opposite directions, or toward each other, at a speed of about ninety revolutions per minute. The incline of the rollers causes the lard compound to flow down between them toward the lower end, and while so passing between the revolving rollers it is bleached to a high degree of whiteness, such bleaching being caused by the grinding or deformation and by the fact that every particle of lard compound is subjected to the extremely-cold surface of the rollers. The circulation of brine through the rollers is performed in any well-known manner and forms no part of this invention.

The advantages of bleaching lard compound in the manner described are, first, a whiter lard compound can be produced than with the ordinary method of cooling by adhesion; second, the lard compound will be much more uniform in quality; third, by my method there will be an increase of the number of pounds of lard compound per hour available to be manufactured without a corresponding increase of the volume of brine or other cooling agent; fourth, the bleaching of lard compound in the manner herein described will decrease the cost of manufacture by reducing the percentage of stearin necessary for the manufacture of firm white lard compound uniform in quality, and, fifth, the apparatus described insures the production of a maximum degree of deformation and cold to produce the above-named results.

Having thus fully described my invention, what I claim as new, and desire to secure by Letters Patent, is—

1. Apparatus for use in bleaching lard compound, comprising hollow inclined rollers in contact throughout their length and having inlets and outlets at opposite ends, respectively, to permit the circulation therethrough of a cooling agent, rotating mechanism combined with said rollers, and means for discharging lard compound upon said rollers at the upper ends thereof.

2. Apparatus for use in bleaching lard compound, comprising hollow inclined rollers in contact throughout their length and having inlets and outlets at opposite ends, respectively, to permit the circulation therethrough of a cooling agent, rotating mechanism combined with said rollers, means for adjusting the degree of contact of said rollers, and means for discharging lard compound upon said rollers at the upper ends thereof.

3. Apparatus for use in bleaching lard compound, comprising hollow inclined rollers in contact throughout their length and having inlets and outlets at opposite ends, respectively, to permit the circulation therethrough of a cooling agent, rotating mechanism combined with said rollers, means for discharging lard compound upon said rollers at the upper ends thereof, and means provided at opposite ends of said rollers for confining the lard compound thereto.

4. Apparatus for use in bleaching lard compound comprising a pair of hollow cylindrical rollers in contact throughout their length, a head secured in the opposite ends of each of said rollers, said heads being supported by bearings in a manner to impart an incline to the rollers, brine inlet and outlet pipes extending through the heads at opposite ends of each of said rollers, respectively, the heads at the lower ends of said rollers being circumferentially grooved to afford a recess, a collar carried by one of said heads and extending across said recess, rotating mechanism combined with said rollers, and means for discharging lard compound upon said rollers at the upper ends thereof.

In testimony whereof I have hereunto set my hand in presence of two subscribing witnesses.

JEROME N. HUMPHREYS.

Witnesses:
 LAMMIN JONES,
 E. L. FLIPPEN.